April 16, 1968  A. G. WILLAMSON ET AL  3,378,374
METHOD FOR CONCENTRATING BREWERS' WORT
Filed Jan. 24, 1964
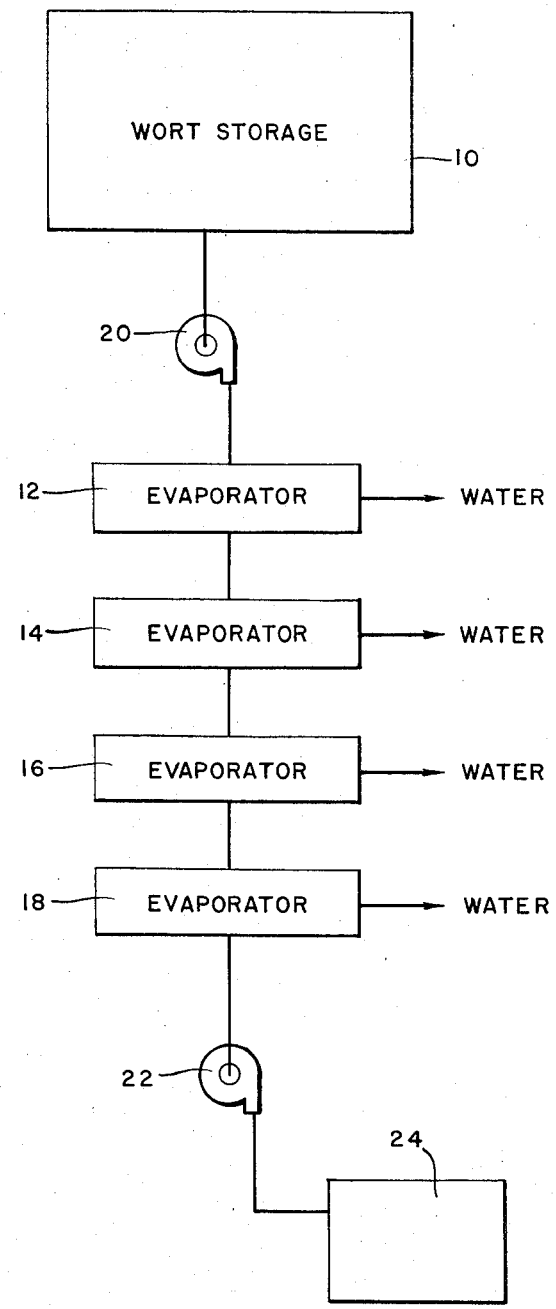
INVENTORS
ALAN G. WILLIAMSON
WILLIAM E. PARKER
BY *Featherstonhaugh & Co.*
ATTORNEYS 3,378,374
METHOD FOR CONCENTRATING BREWERS' WORT
Alan G. Williamson, Pepper Pike, Ohio, and William E. Parker, Toronto, Ontario, Canada, assignors to Canadian Breweries Limited, Toronto, Ontario, Canada
Filed Jan. 24, 1964, Ser. No. 339,901
Claims priority, application Canada, Oct. 1, 1963, 885,701
3 Claims. (Cl. 99—52)

This invention relates to the concentration of brewers' wort.

Brewers of malt beverages in the normal course of their trade first manufacture a wort and then ferment the wort to produce a potable beverage such as ale beer or the like that is bottled and shipped in bottles for consumption. Many brewers ship a good proportion of their production long distances to market with the result that their shipping costs are relatively high. The capital cost of a complete brewery is also very high and for that reason brewers tend to put up with the high costs of transportation rather than locate new plants close to their distant markets.

In the past, considerable thought has been given to the problem of high shipping costs and it has been proposed to produce the brewers wort and concentrate it by removing a part of the water content at a central location and then ship it to distant market points in bulk form. At the distant points a plant would be set up to reconstitute the concentrated wort by adding water and fermenting it to make a potable beverage such as ale, beer or the like and bottle it for sale. The plan has a great deal of merit because it reduces both plant and transportation costs. It uses one wort-making plant to satisfy the requirements of a number of fermenting plants and the costs of shipping a quantity of concentrated wort in bulk form are less than the costs of shipping a related quantity of end product in bottles or kegs.

Attempts have been made to concentrate brewers wort by evaporation of a part of the water content thereof, but they have failed to develop into commercial processes because the potable beverage produced from the reconstituted worts was not similar to that produced from the unconcentrated worts. It had a caramelized flavour and had lost some of its bitterness.

The difficulty experienced in past attempts to concentrate wort have been overcome by this invention with the result that the advantages of shipping wort in the concentrated form outlined above can be achieved in the manufacture and distribution of beer and like potable beverages.

According to this invention brewers' wort is concentrated to a predetermined gravity by heating it for a short interval of time only to a temperature below the caramelizing temperature for said short interval of time and predetermined specific gravity while maintaining the pressure at less than atmospheric to achieve an aqueous boil off. A most important feature of the process is the short heating time. The invention will be clearly understood after reference to the following detailed specification read in conjunction with the drawing.

In the drawing, the figure is a schematic illustration of the carrying out of a process according to the invention.

Brewers wort taken from the brew kettles just prior to passing to the fermenation process customarily has a gravity of between 10° and 12° Balling (10–12% solids). According to this invention wort of about this specification is concentrated for the useful purpose of shipping it to a distant point for reconstitution at the distant point and fermentation at the distant point. The method of this invention consists of heating the wort for a short interval of time only to a temperature below the caramelizing temperature for the short interval and specific gravity of the end concentration.

As indicated above, the difficulties previously encountered with the concentration of wort has been the avoidance of a caramelized flavour and loss of characteristic bitterness. These difficulties can be avoided by carrying out the process of this invention.

It has been discovered caramelization and loss of bitterness in evaporation processes involving brewers wort is a function of at least the temperature to which the wort is raised, the contact time of the wort with the heating surface of the evaporator that heats the wort and the end specific gravity of the concentrated product at the time of evaporation. As the specific gravity of the product increases caramelization tends to take place at a lower temperature. If the contact time is maintained short, caramelization is not likely to take place; if, however, the contact time is permitted to extend caramelization usually will take place when other conditions of temperature, pressure and gravity are the same.

The process according to this invention is carried out at a pressure less than atmospheric so that boil off takes place at a relatively low temperature.

For any specific gravity of wort desired, then, the wort is heated to a predetermined temperature for a short time only. The temperature must be below the caramelization temperature for the time interval selected and specific gravity of the wort at that stage. The process as indicated above is carried out at less than atmospheric pressure so that the desired boil off takes place at the temperature selected which will be below the temperature that boil off would take place under atmospheric conditions.

The evaporation process can be carried out in a single pass of the wort through one evaporator or by several passes through several evaporators connected in series. In practice the use of several evaporators is preferred. The process has worked very satisfactorily by passing the wort through four evaporators. In the first evaporator, the gravity was increased to about 35% solids from about 10% solids. The wort was heated for about ten seconds to a temperature of about 160° F. In the second pass, the wort was increased in gravity to about 65% solids. The time interval of heating was again about 10 seconds and the maximum temperature was 135° F. In the third pass the gravity was increased to about 75% solids with a heating time of about 10 seconds and a maximum temperature of about 125° F. In the fourth pass the gravity was increased to about 82% with a heating time of about 10 seconds and a maximum temperature of about 125° F. In each pass the pressure in the evaporator is less than atmospheric so that the required water boil off occurs as a result of the heating. Flow rate depends on type and size of equipment. A flow rate of 80 barrels an hour has worked well.

The contact time is capable of variation, the process is practical with contact time of up to 1 minute. There are probably no lower limits for the contact time subject to the practical limitation of getting a satisfactory and sufficient boil off of water. The process has been operated satisfactory with contact time as low as 0.5 second. The preferred contact time is about 10 seconds. However, contact times in between say 40 seconds are contemplated.

The operation can be carried out on a standard rising-falling film or wiped film type of evaporator or such other evaporators that will achieve the required evaporation in the short interval of time. An evaporator known commercially as the A.P.V. has been found satisfactory.

After concentration the wort is shipped to a distant site where it is reconstituted by adding water and carrying out fermentation to produce malt beverage.

In the drawing a plant for practicing the method is schematically illustrated. The numeral 10 refers to a wort storage tank adapted to receive hot wort from the brew kettles. Numerals 12, 14, 16 and 18 each refer to evaporators. In use a pump 20 and 22 maintains a flow of the wort from the wort storage through the serially connected evaporators which operate in accordance with the above description to remove water from the wort as indicated by the arrows after which it is delivered in concentrated form to the shipping containers 24.

What is claimed is:

1. A method of concentrating brewers' wort which comprises subjecting it to successive heat treatments each to achieve an aqueous boil-off, the total of said heat treatments being for a period of time sufficient to reduce the wort to a predetermined specific gravity that has more than 35% solids, the predetermined specific gravity for successive heat treatments being increased, each of said heat treatments comprising the step of heating the wort for a short interval of time that is less than one minute to a temperature below the caramelization temperature for such a short interval of time and said predetermined specific gravity while maintaining the pressure at less than atmospheric to achieve an aqueous boil-off.

2. A method of concentrating brewers' wort as claimed in claim 1 in which said short interval of time is less than 40 seconds.

3. A method of concentrating brewers' wort as claimed in claim 1 in which said short interval of time is about 10 seconds.

References Cited 522     1853   Great Britain.
704   2/1880   Great Britain.

OTHER REFERENCES

Tressler et al.: "The Chemistry and Technology of Fruit and Vegetable Juice Production," 1954, Avi Publ. Co., N.Y., pp. 668–672.

MAURICE W. GREENSTEIN, *Primary Examiner.*
A. LOUIS MONACELL, *Examiner.*